United States Patent
Farahati et al.

(10) Patent No.: US 9,593,713 B2
(45) Date of Patent: Mar. 14, 2017

(54) THRUST WASHER INCLUDING WET FRICTION MATERIAL WITH RESIN COATED SURFACE

(71) Applicant: Schaeffler Technologies GmbH & Co. KG, Herzogenaurach (DE)

(72) Inventors: Rashid Farahati, Copley, OH (US); Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 30 days.

(21) Appl. No.: 14/259,972

(22) Filed: Apr. 23, 2014

(65) Prior Publication Data

US 2014/0321782 A1    Oct. 30, 2014

Related U.S. Application Data

(60) Provisional application No. 61/815,923, filed on Apr. 25, 2013.

(51) Int. Cl.
| | |
|---|---|
| *F16C 17/04* | (2006.01) |
| *F16C 33/10* | (2006.01) |
| *F16C 33/20* | (2006.01) |

(52) U.S. Cl.
CPC ............ *F16C 17/04* (2013.01); *F16C 33/205* (2013.01); *F16C 33/208* (2013.01); *Y10T 156/10* (2015.01)

(58) Field of Classification Search
CPC ........... B32B 2255/02; B32B 2260/021; F16C 33/20; F16C 33/203; F16C 33/208; F16C 17/04; F16C 17/045; F16C 33/145; F16C 33/6629; F16C 33/6681

USPC ............. 384/368, 420, 276, 279, 291, 625; 428/297.4, 300.7, 301.1; 442/97, 101, 442/175, 161

See application file for complete search history.

(56) References Cited

U.S. PATENT DOCUMENTS

| | | |
|---|---|---|
| 5,188,867 A | 2/1993 | Chu et al. |
| 5,646,076 A | 7/1997 | Bortz |
| 5,952,249 A | 9/1999 | Gibson et al. |
| 6,247,568 B1 * | 6/2001 | Takashima ............. F16H 45/02 192/113.36 |
| 6,983,681 B2 * | 1/2006 | Iwata .................. F04B 27/1054 92/12.2 |
| 8,281,912 B2 | 10/2012 | Jameson |

(Continued)

FOREIGN PATENT DOCUMENTS

| | | |
|---|---|---|
| JP | 63-022888 A | 1/1988 |
| JP | 07-020681 B2 | 3/1995 |

(Continued)

OTHER PUBLICATIONS

PCT Search Report and Written Opinion for corresponding International Application PCT/US2014/035064.

*Primary Examiner* — Phillip A Johnson
(74) *Attorney, Agent, or Firm* — Davidson, Davidson & Kappel, LLC

(57) ABSTRACT

A thrust washer is provided. The thrust washer includes a wet friction material and a phenolic resin layer coating an outer surface of the wet friction material. A torque converter comprising the thrust washer is also provided. A method of forming a thrust washer is further provided. The method includes providing a layer of phenolic resin on an outer surface of a wet friction material.

10 Claims, 2 Drawing Sheets

(56) References Cited

U.S. PATENT DOCUMENTS

| | | | |
|---|---|---|---|
| 2003/0185475 A1* | 10/2003 | Iwata | F04B 27/1054 384/420 |
| 2005/0025951 A1 | 2/2005 | Gruber et al. | |
| 2006/0034556 A1* | 2/2006 | Thompson | F16C 9/02 384/288 |
| 2007/0160314 A1* | 7/2007 | Richie | F16C 17/065 384/121 |
| 2008/0308365 A1* | 12/2008 | Foge | F16B 39/225 188/251 A |
| 2013/0037373 A1 | 2/2013 | Dong et al. | |

FOREIGN PATENT DOCUMENTS

| | | | | |
|---|---|---|---|---|
| JP | 11170397 A | * | 6/1999 | |
| JP | 2002147509 A | * | 5/2002 | |

\* cited by examiner

THRUST WASHER INCLUDING WET FRICTION MATERIAL WITH RESIN COATED SURFACE

This claims the benefit to U.S. Provisional Patent Application No. 61/815,923, filed on Apr. 25, 2013, which is hereby incorporated by reference herein.

The present disclosure relates to thrust washers for use in a torque converter.

BACKGROUND

U.S. Pat. No. 5,188,867 discloses a thermoplastic film coating including an acrylic copolymer made from 30 to 60% finely divided wax, 5 to 25% finely divided inorganic solid and 0 to 1% talc or Syloid.

U.S. Pat. No. 8,281,912 discloses that thrust washers for torque converters are usually plastic or metal.

SUMMARY OF THE INVENTION

A thrust washer is provided. The thrust washer includes a wet friction material and a phenolic resin layer coating an outer surface of the wet friction material.

Embodiments of the thrust washer may also include one or more of the following advantageous features:

The phenolic resin layer may be a laminated sheet of phenolic resin. The wet friction material may include surface pores and the phenolic resin may fill the surface pores. The phenolic resin may include grooves formed in an outer surface thereof. The thrust washer may further include a metal layer, the wet friction material being attached to the metal layer. The phenolic resin may include a first phenolic resin layer on a first outer surface of the wet friction material and a second phenolic resin layer on a second outer surface of the wet friction material. The wet friction material may include a first wet friction material layer on a first outer surface of the metal layer and a second wet friction material layer on a second outer surface of the metal layer. The first wet friction material layer may include the first outer surface of the wet friction material and the second wet friction material layer may include the second outer surface of the wet friction material.

A torque converter is also provided that includes the thrust washer.

A method of forming a thrust washer is also provided. The method includes providing a layer of phenolic resin on an outer surface of a wet friction material.

Embodiments of the method may also include one or more of the following advantageous features:

The layer of phenolic resin layer provided on the outer surface of the wet friction material may be a laminated sheet of phenolic resin. The method may further include providing a layer of non-stick material on top of the phenolic resin layer. The providing the layer of phenolic resin on the outer surface of the wet friction material may include curing the phenolic resin layer onto the wet friction material after the layer of non-stick material is provided on top of the phenolic resin. The curing may include pressing the phenolic resin layer onto the wet friction material with a hot press. The pressing may include pressing a hot press plate against the non-stick material to cure the phenolic resin onto the wet friction material. The providing the layer of phenolic resin on the outer surface of the wet friction material may include coating two opposing outer surfaces of the wet friction material with phenolic resin layers to form a first phenolic resin layer and a second phenolic resin layer. The method may further include providing a first layer of non-stick material on an outer surface of the first phenolic resin layer and a second layer of non-stick material on an outer surface of the second phenolic resin layer. The providing the layer of phenolic resin on the outer surface of the wet friction material may include curing the phenolic resin onto the wet friction material after the first and second layers of non-stick material are provided on the outer surfaces of the first and second phenolic resin layers on top of the phenolic resin by pressing a first hot press section against the first layer of non-stick material to cure the first phenolic resin layer onto the wet friction material and pressing a second hot press section against the second layer of non-stick material to cure the second phenolic resin layer onto the wet friction material. The wet friction material may include a first layer of wet friction material and a second layer of wet friction material. The method may further include providing a metal layer between the first and second layers of wet friction material. The method may further include providing the wet friction material on a metal layer.

BRIEF DESCRIPTION OF THE DRAWINGS

The present invention is described below by reference to the following drawings, in which.

DETAILED DESCRIPTION

Figure 1:
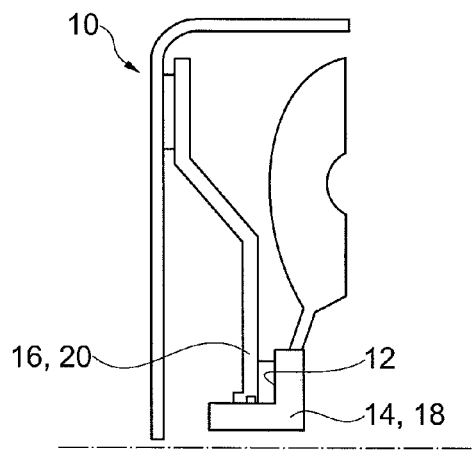
FIG. 1 shows a torque converter according to an embodiment of the present invention.

FIG. 1 shows a portion of a torque converter 10 according to an embodiment of the present invention. Torque converter 10 includes a thrust washer 12 positioned axially between a first rotating component 14 and a second rotating component 16, at least one of which subjects the other component 14, 16 to a thrust. In this embodiment, component 14 is a turbine hub 18 and component 16 is a piston 20. In other embodiments, thrust washer 12 may be positioned between different rotating components of a torque converter. Fluid within torque converter 10 flows along outer surfaces 32 of thrust washer 12 to help prevent wear between components 14, 16.

Figure 2:
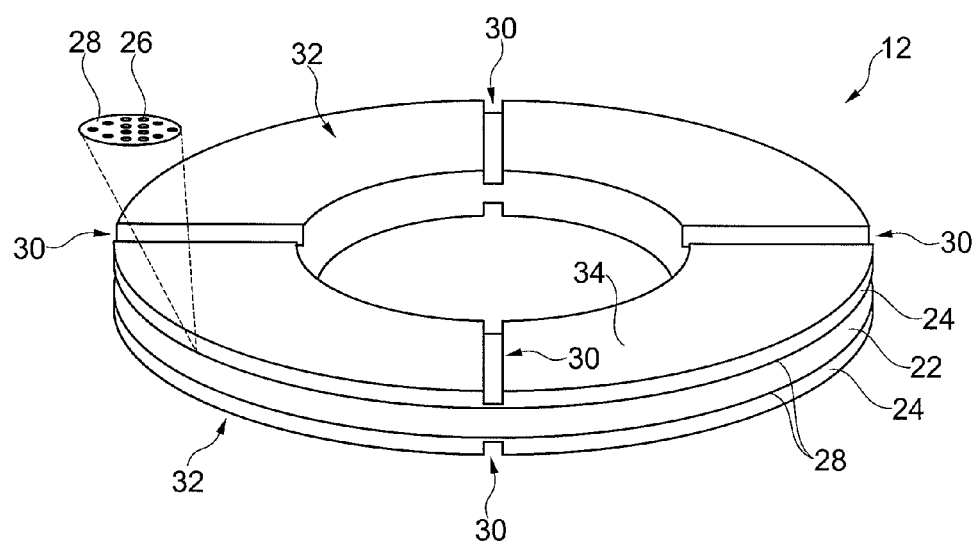
FIG. 2 shows a thrust washer in accordance with an embodiment of the present invention.

FIG. 2 shows thrust washer 12 in accordance with an embodiment of the present invention. Thrust washer 12 is ring shaped and includes a wet friction material layer 22 sandwiched between two phenolic resin layers 24. Phenolic resin layers 24 may be for example Resin Arofene 295-E-50 or MACtac IF-4023A. Wet friction material layer 22 is a porous material including surface pores 26 on opposing outer surfaces 28 thereof before phenolic resin layers 24 are applied to outer surfaces 28. Phenolic resin layers 24 are formed on wet friction material layer 22 such that surface pores 26 are filled by the phenolic resin and outer surfaces 32 of thrust washer 12 have a low coefficient of friction, which provides for smooth interactions between outer surfaces 32 and components 14, 16. Wet friction material layer 22 may be formed of any known wet friction material, for example a fiber matrix impregnated with resin. A plurality of grooves 30 may be formed in the outer surfaces 32, at outer surfaces 34 of phenolic resin layers 24, to provide passages for fluid to flow along outer surfaces 32.

Figure 3A:
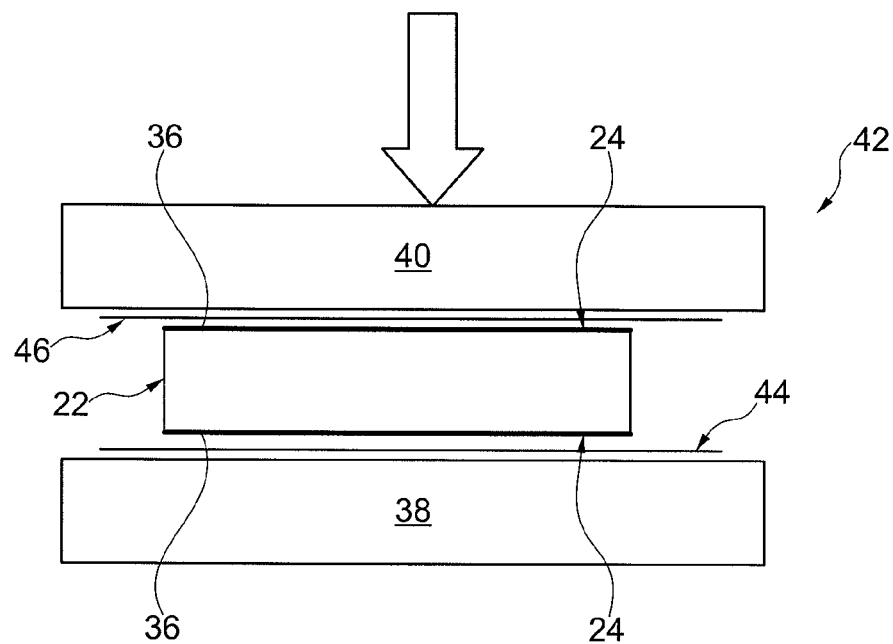
FIG. 3a schematically shows a method for forming the thrust washer shown in FIG. 2 in accordance with an embodiment of the present invention.

FIG. 3a schematically shows a method for forming thrust washer 12 in accordance with an embodiment of the present invention. Wet friction material layer 22 is coated with phenolic resin layers 24 on opposite sides thereof. In one preferred embodiment, phenolic resin layers 24 are formed as laminated sheets. Phenolic resin layers 24 are appropriately positioned on outer surfaces 36 of wet friction material layer 22 and layers 22, 24 are placed between two press sections of a hot press 42, which is this embodiment are a lower press plate 38 and an upper press plate 40. A first non-stick layer 44 is provided between the lower phenolic resin layer 24 and lower press plate 38 a second non-stick layer 46 is provided between the upper phenolic resin layer 24 and upper press plate 40 to prevent phenolic resin layers 24 from sticking to press plates 38, 40. Non-stick layers 44, 46 may be formed of for example waxed paper or TEFLON. Press plates 38, 40 are heated to between 350° F. and 420° F. and a downward force may be applied to upper press plate 40 to heat and cure phenolic resin layers 24, causing phenolic resin layers 24 to plug surface pores 26 of wet friction material 22.

Figure 3B:
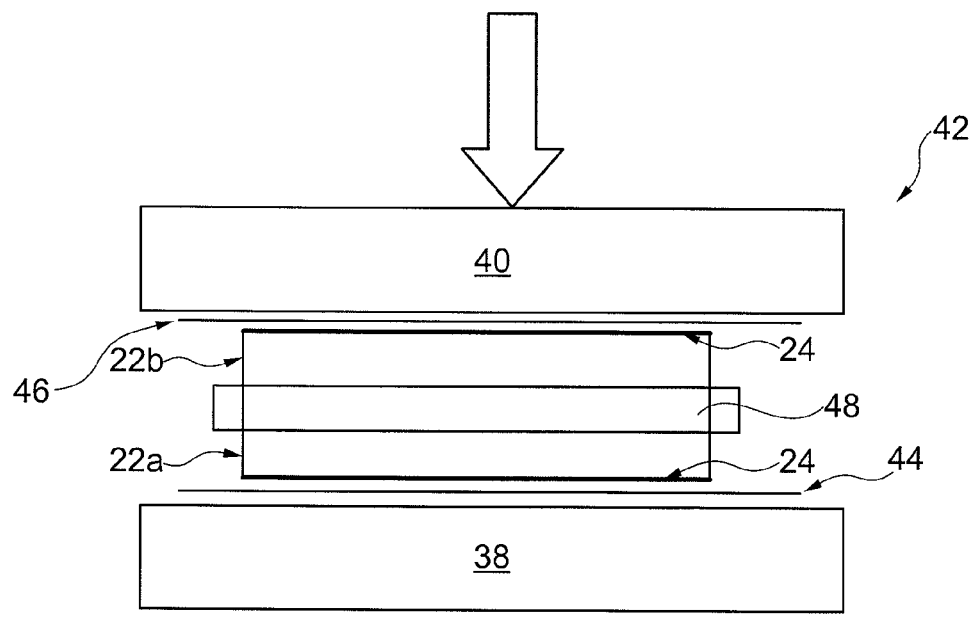
FIG. 3b schematically shows a method for forming a thrust washer in accordance with an alternative embodiment of the present invention.

FIG. 3b schematically shows a method for forming a thrust washer 12a in accordance with an alternative embodiment of the present invention. In this embodiment, thrust washer 12a is formed in the same manner as thrust washer 12, but with wet friction material 22 being split into a first wet friction material layer 22a and a second wet friction material layer 22b that are separated by a metal layer 48. Layers 22a, 22b may be attached to metal layer 48 by adhesive or another connection. As with the embodiment in FIG. 3a, non-stick layers 44, 46 are provided between resin layers 24 and respective press plate 38, 40, which are used to heat and cure phenolic resin layers 24, causing phenolic resin layers 24 to plug surface pores 26 of wet friction material 22.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A thrust washer comprising:
    a wet friction material including a fiber matrix impregnated with resin; and
    a phenolic resin layer coating at least one outer surface of the wet friction material, the phenolic resin layer having a lower coefficient of friction than the wet friction material, the thrust washer being configured for helping to prevent wear between two rotating components.

2. The thrust washer as recited in claim 1 wherein the phenolic resin layer is a laminated sheet of phenolic resin.

3. The thrust washer as recited in claim 1 wherein the wet friction material includes surface pores, a phenolic resin of the phenolic resin layer filling the surface pores.

4. The thrust washer as recited in claim 1 wherein the phenolic resin layer includes grooves formed in an outer surface thereof.

5. The thrust washer as recited in claim 1 further comprising a metal layer, the wet friction material being attached to the metal layer.

6. The thrust washer as recited in claim 1 wherein the phenolic resin layer includes a first phenolic resin layer on a first outer surface of the wet friction material and a second phenolic resin layer on a second outer surface of the wet friction material.

7. The thrust washer as recited in claim 6 further comprising a metal layer, the wet friction material including a first wet friction material layer on a first outer surface of the metal layer and a second wet friction material layer on a second outer surface of the metal layer, the first wet friction material layer including the first outer surface of the wet friction material, the second wet friction material layer including the second outer surface of the wet friction material.

8. A torque converter comprising the thrust washer recited in claim 1.

9. The torque converter as recited in claim 8 further comprising a first component and a second component, at least one of the first component and the second component subjecting the other of the first and second component to a thrust, the thrust washer being positioned between the first and second components to absorb the thrust and to help to prevent wear between the first and second components.

10. A thrust washer comprising:
    a single wet friction material layer; and
    a first phenolic resin layer coating a first outer surface of the wet friction material layer to form a first outer surface of the thrust washer and a second phenolic resin layer coating a second outer surface of the wet friction material layer opposite of the first outer surface to form a second outer surface of the thrust washer, the first and second phenolic resin layers each having a lower coefficient of friction than the wet friction material layer, the thrust washer being configured for helping to prevent wear between two rotating components.

* * * * *